(12) United States Patent
Barrett et al.

(10) Patent No.: US 10,499,681 B2
(45) Date of Patent: Dec. 10, 2019

(54) COATED FOOD PRODUCT AND METHODS

(71) Applicant: General Mills, Inc., Minneapolis, MN (US)

(72) Inventors: Christopher J. Barrett, Minneapolis, MN (US); Daniel R. Green, Minnetonka, MN (US); Victor T. Huang, Maple Grove, MN (US); Christine M. Nowakowski, Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 442 days.

(21) Appl. No.: 13/624,073

(22) Filed: Sep. 21, 2012

(65) Prior Publication Data

US 2013/0071524 A1    Mar. 21, 2013

Related U.S. Application Data

(60) Provisional application No. 61/537,354, filed on Sep. 21, 2011, provisional application No. 61/537,375, filed on Sep. 21, 2011.

(51) Int. Cl.
| | |
|---|---|
| A23P 20/10 | (2016.01) |
| A23G 3/34 | (2006.01) |
| A23L 7/122 | (2016.01) |

(52) U.S. Cl.
CPC ............ *A23P 20/10* (2016.08); *A23G 3/0065* (2013.01); *A23G 3/0089* (2013.01); *A23G 3/343* (2013.01); *A23L 7/122* (2016.08)

(58) Field of Classification Search
USPC ........................................................ 426/549
See application file for complete search history.

(56) References Cited

U.S. PATENT DOCUMENTS

| | | |
|---|---|---|
| 2,788,277 A | 4/1957 | Huber |
| D202,609 S | 10/1965 | Weis et al. |
| (Continued) | | |

FOREIGN PATENT DOCUMENTS

| | | |
|---|---|---|
| EP | 1733629 A1 | 12/2006 |
| GB | 2012722 | 8/1990 |
| WO | WO 2005051094 A2 * | 6/2005 |

OTHER PUBLICATIONS

Saleka-Gerhardt, et al., "Non-Isothermal and Isothermal Cyrstallization of Sucrose from the Amorphous State" Pharmaceutical Research, Cover Date: Aug. 1, 1994, Publisher: Springer Netherlands, Issn: 0724-8741, pp. 1166-1173, vol. 11, Iss. 8.

(Continued)

*Primary Examiner* — Katherine D Leblanc
(74) *Attorney, Agent, or Firm* — Diederiks & Whitelaw, PLC; Gregory P. Kaihoi, Esq.

(57) ABSTRACT

Described are food products such as ready to eat cereal having a base and a coating; examples include a base, a slurry layer over the base produced by applying a slurry coating to the base, the slurry layer having less than about 80% sucrose on a dry weight basis, and a particulate layer on the slurry layer. The particulate layer can be produced by dry charging particulates onto the slurry coated base. Particulates include be one or more of pregel starch, high molecular weight dextrin, high molecular weight soluble fiber, partially soluble fiber, insoluble fiber, protein, low solubility non-sugar compound, or sucrose, for example.

26 Claims, 4 Drawing Sheets

(56) References Cited

U.S. PATENT DOCUMENTS

| | | | |
|---|---|---|---|
| 3,246,990 | A | 4/1966 | Thompson et al. |
| 3,464,827 | A | 9/1969 | Tsuchiya et al. |
| 3,600,193 | A | 8/1971 | Glabe et al. |
| 3,687,687 | A | 8/1972 | Liepa |
| 3,814,822 | A | 6/1974 | Henthorn et al. |
| 3,840,685 | A | 10/1974 | Lyall et al. |
| 4,089,984 | A * | 5/1978 | Gilbertson .................. 426/293 |
| 4,101,680 | A | 7/1978 | Edwards |
| 4,338,339 | A | 7/1982 | Edwards |
| 4,379,171 | A | 4/1983 | Furda et al. |
| 4,755,390 | A * | 7/1988 | Calandro et al. ............ 426/293 |
| 4,859,477 | A | 8/1989 | Augustine et al. |
| D339,443 | S | 9/1993 | Bielinski et al. |
| D339,444 | S | 9/1993 | Evenson et al. |
| D341,469 | S | 11/1993 | Evanson et al. |
| 5,318,794 | A | 6/1994 | Richards et al. |
| 5,342,188 | A | 8/1994 | Zimmermann |
| 5,372,826 | A | 12/1994 | Holtz et al. |
| 5,424,085 | A | 6/1995 | Hsieh et al. |
| D368,791 | S | 4/1996 | Laughlin |
| D372,352 | S | 8/1996 | Laughlin |
| D373,671 | S | 9/1996 | Laughlin et al. |
| D384,785 | S | 10/1997 | Laughlin |
| D403,485 | S | 1/1999 | Clanton et al. |
| 6,143,342 | A | 11/2000 | Weinstein et al. |
| 6,149,965 | A | 11/2000 | Van Lengerich et al. |
| 6,495,179 | B1 | 12/2002 | Zietlow et al. |
| 6,746,707 | B2 | 6/2004 | Krysiak |
| 6,793,953 | B2 | 9/2004 | Zietlow |
| 8,394,437 | B2 | 3/2013 | Lykomitros et al. |
| 2005/0255218 | A1 | 11/2005 | Green et al. |
| 2005/0266142 | A1 | 12/2005 | Green et al. |
| 2006/0257549 | A1 | 11/2006 | Overly, III et al. |
| 2007/0237860 | A1 | 10/2007 | Abu-Ali et al. |
| 2008/0317919 | A1 * | 12/2008 | Long ...................... A23L 1/095 426/307 |
| 2010/0173051 | A1 | 7/2010 | Froseth et al. |
| 2010/0183772 | A1 | 7/2010 | Clanton et al. |
| 2011/0183046 | A1 | 7/2011 | Nack et al. |

OTHER PUBLICATIONS

Fast et al., "Application of Nutritional and Flavoring/Sweetening Coatings" Breakfast Cereals and How they Are Made, Minnesota, AACC, US, pp. 195-220, XP002165120, Jan. 1, 1990.

Anonymous, "ROMPP-Isomeratzucker" Rompp, Jan. 1, 2015, XP055190750, URL:https://roempp.thierne,de/roempp4.0/do/data/RD-09-01623 [retrieved May 21, 2015].

* cited by examiner

COATED FOOD PRODUCT AND METHODS

CROSS REFERENCE TO RELATED APPLICATION

This application claims the benefit under 35 U.S.C. § 119(e) of U.S. Provisional Patent Application No. 61/537,354, filed Sep. 21, 2011, and titled "REDUCED SUCROSE PRE-SWEETENED BREAKFAST CEREAL AND METHOD OF PREPARATION," and U.S. Provisional Application No. 61/537,375, filed Sep. 21, 2011, and titled "METHODS FOR MAINTAINING PLANT PRODUCTION CAPACITY AND REDUCING CLUMPING OF CEREALS," the entireties of each being incorporated herein by reference.

BACKGROUND

The present invention is directed generally to food products and to their methods of preparation. In particular, the present invention is directed to sugar coatings for foods such as breakfast cereals that are sucrose reduced, e.g., pre-sweetened breakfast cereal products comprising such coatings, and to methods for making such coatings and coated finished food and cereal products.

Ready-to-eat ("RTE") breakfast cereals are popular packaged food items. RTE cereals exist in many different varieties can be grouped into two broad categories: puffed and un-puffed cereals. Puffed cereals are foamed grain based pieces. Typically used are oat, corn (maize), rice, and blended grains that are mixed with water sufficient to form a dough and cooked in such a way that the final texture is crisp and aerated. Un-puffed cereals include 1) flaked cereals (e.g., corn flakes, wheat flakes, rice flakes, mixed grain flakes), and to a lesser extent 2) shreds (whether from whole grains or from cooked cereal doughs), 3) biscuits, including filled or unfilled, 4) shredded biscuits, including filled and unfilled, and 5) granola cereals.

Often, such products include various coatings usually comprising nutritive carbohydrate sweeteners such as sucrose, corn syrup (also known as glucose syrup), fructose, etc. Conventionally, presweetened breakfast cereals have been prepared by first producing cereal pieces (a cereal base), coating the cereal pieces with an aqueous slurry or solution of sweeteners, and then drying the coated pieces in an oven or air current to remove moisture.

Pre-sweetened coatings typically comprise sucrose as their principal ingredient. As the level of sucrose in the coating decreases and the level of corn syrups increases, the coating compositions becomes less crystalline and more sticky and hygroscopic. While such properties can be desirable in applications wherein a sugar syrup is used as a binder for generating particulate agglomerates (e.g., for use in granola or cereal bars), such stickiness is undesirable in pre-sweetened RTE cereal production. Stickier products are not optimal for processing efficiency. Also, the resultant finished product is more hygroscopic, and as moisture is absorbed over time the products becomes stickier, causing reduced consumer acceptance and organoleptic properties (e.g., an RTE cereal may not pour well from the package). Consequently, corn syrup substitution for sucrose is generally limited to about one part in five for an acceptable sugar coating formulation for the preparation of a pre-sweetened cereal.

Current consumer trends favor reduced sugar products. Thus, there is a desire for reduced sugar containing pre-sweetened cereal products. Sugar refers to all the monosaccharides and disaccharides contained in a finished food (e.g., cereal) product. Reduced sugar containing products can be prepared simply by reducing the amount or ratio of sugar based pre-sweetener applied to the cereal base. Typically, in a pre-sweetened breakfast cereal, the ratio of coating to base can be about 1:1. Such reductions, however, come at the expense of reductions in other desirable cereal product attributes. For example, sweetness perception is reduced. Also, crispness or bowl life of the product in milk can be unacceptably reduced. Sucrose is the major contributor to sugar content in cereals and is typically 80 wt % or more of a sugar coating on a dry basis. As such, the sugar content of the coating composition can be reduced by decreasing the amount of sucrose contained within the coating. However, the crystallinity of the sucrose in the coating decreases, and the cereal becomes more hygroscopic.

Another problem with either reducing the amount of the sugar coating used, or the sucrose content of the coating, is a reduction in production capacity, such that production becomes inefficient.

In light of the difficulties of reducing the sucrose content of a pre-sweetened breakfast cereal while maintaining the benefits and eating qualities of conventional high sucrose level consumer food products, there is a continuing need for reduced sucrose coating formulations and finished pre-sweetened RTE cereal products. Particularly desired are coatings that do not reduce processing efficiency, cereal texture, bowl life, and eating qualities.

SUMMARY

Embodiments of the invention include sugar coated food products, e.g., RTE cereals, having reduced sugar and methods of producing such cereals. Desirably, the sugar coating and food product, e.g., RTE cereal, does not exhibit undue clumping or hygroscopicity, which can otherwise be expected from a reduced sugar coating. In some embodiments, an RTE cereal having reduced sugar and reduced clumping includes an inner base, a slurry layer (also referred to as a sugars slurry layer) produced by applying a slurry coating to the base, and a particulate coating surrounding the slurry layer produced by dry charging the particulates onto the slurry coated base. The combined slurry layer and particulates can be referred to herein as the "coating" or the "sugar coating." In some embodiments the slurry layer can have less than about 80% sucrose on a dry weight basis, such as from 40 to 80% sucrose, e.g., 50 to 80% sucrose, or 70-79% sucrose. In some embodiments the coating (slurry layer and particulates) can have less than about 80% sucrose on a dry weight basis, such as from 40 to 80% sucrose, e.g., 50 to 80% sucrose, or 70-79% sucrose.

The slurry can also include non-sucrose soluble solids such as high conversion maltodextrin, low conversion glucose syrup having a dextrose equivalent of about 1 to less than about 10, and similar non-sucrose sweeteners, or a combination of these, for example.

The slurry (or, sometimes herein, "slurry coating") can be provided in a sufficient amount to adhere the particulate coating to the cereal base and slurry without a coating layer around the particulate layer. In other words, embodiments of the coating can consist of or be made of only two applied layers: the slurry and the particulates. Various particulates can be dry charged (i.e., applied in a dry form such as a powder) onto the slurry coated base. Examples of such particulates include pregel starch (such as flour or whole grain flour), high molecular weight dextrin, high molecular weight soluble fiber, partially soluble fiber, protein, low solubility non-sugar compound, and sucrose. In some embodiments, the particulate layer is a pregel starch, which can be obtained from cereal regrinds or from pregel whole grain flour, for example.

In some embodiments, an RTE cereal having reduced sugar and reduced clumping can include an inner base, a slurry layer produced by applying a slurry coating which is a syrup having about 40 or 50% to about 70% or 80% sucrose, to the base, and a particulate coating surrounding the slurry layer produced by dry charging particulates onto the slurry coated base, such that the sugar coated cereal contains about 28 weight percent or less total sugar. The particulate layer can be, for example, a high molecular weight dextrin, a high molecular weight soluble fiber, a partially soluble fiber, insoluble fiber, a protein, a low solubility non-sugar compound, sucrose, or a pregel starch such as a pregel whole grain flour.

Other embodiments include a method of preparing a reduced sugar RTE cereal including preparing a cereal base, coating the base with a slurry, the slurry layer having less than about 80% sucrose, and dry charging the slurry coated base with particulates to form a particulate layer. The cereal produced by this method can have a sugar content of about 32 weight percent or less total sugar, or about 28 weight percent or less total sugar, for example. The particulate layer can form the outermost layer of the cereal and can adhere to the cereal without the use of an overcoating layer. The particulates can be, for example, pregel starch, high molecular weight dextrin, high molecular weight soluble fiber, partially soluble fiber, insoluble fiber, protein, low solubility non-sugar compound, or sucrose. In some embodiments, the particulate layer includes pregel starch, which can be obtained from cereal regrinds.

In one aspect the invention relates to a ready to eat cereal comprising: a base; a slurry layer on the base produced by applying a slurry coating to the base, the slurry layer having less than about 80% sucrose on a dry weight basis; and a particulate coating on the slurry layer.

In another aspect the invention relates to a ready to eat cereal comprising: a base; a slurry layer on the base produced by applying a slurry coating to the base, the slurry comprising a syrup and having about 50% to about 70% sucrose; and a particulate layer on the slurry layer produced by dry charging particulates onto the slurry layer; wherein the cereal has about 28 weight percent or less sugar.

In another aspect the invention relates to method of preparing a ready to eat cereal. The method includes: providing a cereal base; coating the base with a slurry, the slurry having a less than about 80% sucrose on a dry basis; and dry charging the slurry-coated base with particulates.

In another aspect the invention relates to a sugar coated food product comprising: a base; a slurry coated on a surface of the base, the slurry comprising less than about 80% sucrose on a dry weight basis; and particulates on the slurry layer.

Figure 1:
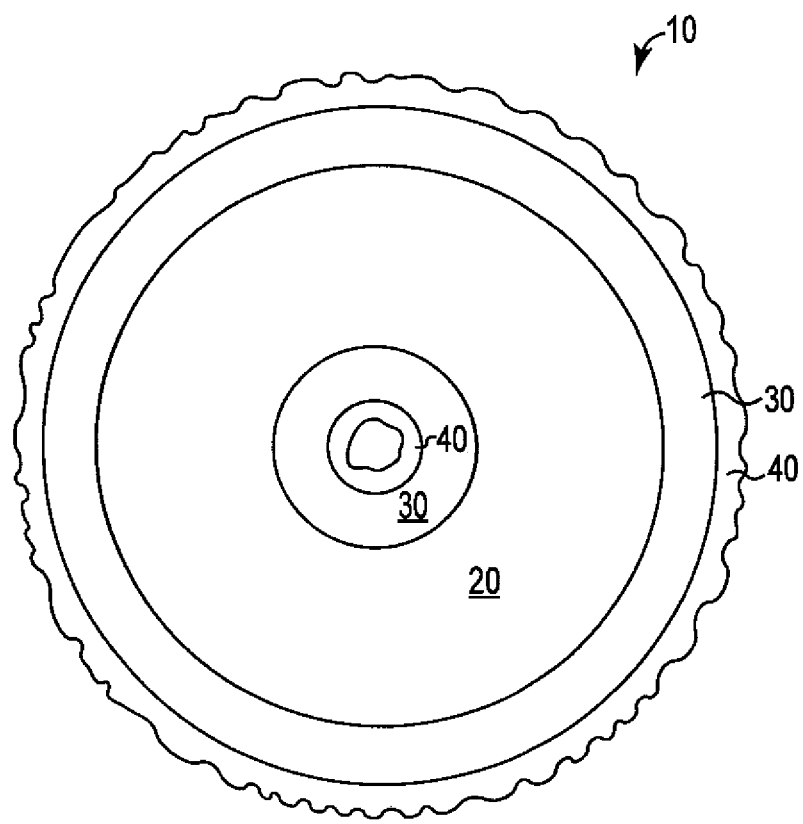
FIG. 1 is a coated cereal according to embodiments of the invention.

The figures are not to scale.

DETAILED DESCRIPTION

Throughout the specification and claims, percentages are by weight (dry weight basis) and temperatures are in degrees Fahrenheit unless otherwise indicated. Each of the referenced patents and applications is incorporated herein by reference.

Embodiments of the invention provide an improved ready to eat sugar coated (e.g., reduced sucrose) cereal having reduced clumping. Reduced clumping can be particularly beneficial after the consumer has opened the RTE food product. RTE cereals having high levels of syrup in their coatings can be more hygroscopic and can exhibit increased tendency to pick up moisture, especially during humid weather. Such moisture pick-up can increase stickiness and lead to increasing undesirable clumping.

The finished cereal product includes a cereal base surrounded by a slurry layer, such as a reduced sucrose slurry layer, and further surrounded by a particulate layer, with the particulate layer comprising any of a variety of particulate materials such as a sugar, a starch, a fiber, a protein, etc., as described. The particulate layer can be applied to the slurry coated cereal by addition of dry particles (i.e., dry charging), and can form the outer layer of the finished cereal product. The resulting product can exhibit decreased hygroscopicity, increased levels of crystalline sucrose, reduced clumping, and optionally improved production efficiency as compared to other reduced sucrose cereals.

Traditional reduced sucrose cereals have coatings comprising higher levels of non-sucrose sweetener such as corn syrup, in replacement or substitution of the foregone or reduced sucrose content. Such reduced sucrose and high non-sucrose sweetener (e.g., corn syrup) sugar coated cereal products have a tendency to absorb moisture from the environment when opened, can readily become tacky, and form clumps. Embodiments of the invention have coatings that are less hygroscopic, that is, they have reduced tendency to absorb moisture. As a result, they are more likely to remain as discrete cereal pieces. Because clumping creates an undesirably large product, a cereal product that is prone to clumping can be difficult to pour out of a package, and consumers find cereal clumping to be undesirable. Therefore this invention represents an important improvement. Cereal clumping can also cause difficulties during production, such as in a dryer, and this can also be reduced by embodiments of the invention. In addition, the reduced clumping can result in less production of "doubles" or joined or connected cereal pieces (e.g., "multiples". Such multiples are typically removed by screening resulting in direct losses in production yield of finished products.

Typically, sucrose crystals provide the primary source of crystallinity in the cereal slurry, though crystallinity can be provided by other ingredients as well. As used herein "crystallinity" generally refers to the crystal content of a finished coating. Crystallinity is an a useful quality of a coating composition of RTE cereals because as crystallinity decreases, the coating becomes more tacky and hygroscopic and prone to clumping. A decrease in crystallinity is therefore a particular problem in the production of reduced sucrose RTE cereals.

The sucrose content of a sugar coated food product such as a breakfast cereal can be reduced by using a low sucrose slurry for the sugar coating. But this method of reducing sucrose content will normally result in a decrease in crystallinity in the coating and therefore an increase in hygroscopicity clumping. Alternatively, a regular slurry having the same amount of sucrose as standard cereals can be used, with less of the slurry being applied to coat the cereal.

The applicant has discovered that a dry particulate coating can be applied to a slurry previously applied to a food (e.g., cereal) piece in a manner that increases sucrose crystallinity of the slurry or the entire coating (slurry layer and particulates), reduces hygroscopicity of the slurry or coating, and can reduce cereal clumping of the coated pieces.

For example, the slurry layer as described, or alternately or also a coating as described (including the slurry layer and the dry charge particles), especially a coating that includes sucrose as part of or most of or substantially all of the dry charged particulates, can contain crystalline sucrose, usually also an amount of non-crystalline sucrose, and optionally non-sucrose soluble solids. Such a coating can be characterized as having a "sucrose ratio" calculated as the total amount (by weight, dry) of sucrose in the coating divided by the total amount (by weight, dry) total soluble solids (i.e., sucrose solids plus non-sucrose solids, but not insoluble solids). According to embodiments of coatings as described, a coating can exhibit a desired combination of moderate or high sucrose crystallinity as well as a reduced sucrose ratio. As one manner of describing the desired combination of sucrose crystallinity to sucrose ratio, crystallinity of the sucrose can be a value y, or greater, calculated according to the formula:

$$\text{crystallinity}(y) \geq 2.28x^2 - 1.19x + 0.28$$

wherein x is a ratio of weight sucrose per total weight soluble solids in the coating. Stated in alternate terms, embodiments of slurry layers and coatings can exhibit a sucrose crystallinity of at least 0.30, 0.35, 0.40, or 0.50 and also a sucrose ratio is a range between from 0.4 or 0.50, to about 0.80; e.g., a sucrose crystallinity of at least 0.50 and a sucrose ratio is a range between 0.40 and 0.80; e.g., a sucrose crystallinity of at least 0.50 and a sucrose ratio is a range between 0.60 and 0.80. The sucrose crystallinity of the dried coating or slurry layer can be measured by standard methods of differential scanning calorimetry, typically measuring crystallinity at a temperature in a range from 200 to 250° F. (or 100 C to 200 C). See, e.g., Applicant's copending U.S. patent application Ser. No. 13/624,002, entitled "SWEETENED FOOD PRODUCT AND METHODS OF PREPARATION," filed on even date herewith and being based on provisional patent application Ser. Nos. 61/537,354 and 61/537,375 both filed Sep. 21, 2011; the entirety of that copending United States patent application is incorporated herein by reference.

An example of a reduced sucrose RTE cereal according to embodiments of the invention is shown in FIG. 1. The RTE cereal piece 10 includes base 20 and multiple coated layers placed on an outer surface of the base. The core or center of the cereal 10 is the cereal base 20, which can be any desired shape. In the embodiment shown, the base 20 is in the shape of an O. The base is at least partially covered by, e.g., surrounded by, a coating, which includes a slurry layer 30 and a particulate layer 40. As illustrated, the slurry layer 30 directly surrounds the base 20, and the particulate layer directly surrounds the slurry layer 30.

The ratio (by weight on a dry basis) of base 20 to coating can range from about 20:1 base to coating (the coating including both slurry layer 30 and the particulate layer 40) to about 1:2. In some embodiments the weight ratio of base 20 to coating, on a dry weight basis, ranges from about 20:1 to about 2:3, or from about 10:1 to about 2:3 in other embodiments. In still other embodiments, the ratio of base 20 to coating ranges from about 2:1 to 1:1.

The cereal may be characterized by a thin (i.e., about 5 to 500 microns in thickness) coating of slurry and particulates. In other embodiments, the coating (slurry and particulates) can be about 50-450 microns. In still other embodiments, the coating can be about 100-400 microns. The slurry layer 30 and particulate layer 40 can blend in the coating. The slurry can from about 10-50% of the finished cereal on a dry weight basis and the particulate layer can from about 0.1-15% of the finished cereal on a dry weight basis. In some embodiments the particulate layer can from about 1% to about 15% of the finished cereal on a dry weight basis.

In some embodiments the coating can be characterized as having a major portion, which is the slurry, and a minor portion, which is the particulate. The major portion can comprise about 75 to 99.9 wt % of the coating and the minor portion can comprise about 0.1 to 25 wt % of the coating on a dry weight basis. In some embodiments the major portion can comprise about 75 to 99% of the coating and the minor portion can comprise about 1 to 25% of the coating on a dry weight basis. In still other embodiments, the major portion can comprise about 85 to 95% of the coating and the minor portion can comprise about 5 to 15 wt % of the coating on a dry weight basis.

The reduced sugar cereals produced according to embodiments of the invention can have less than about 32 wt % total sugar (or 32 grams sugar per 100 grams of cereal), such as 9 grams or less of sugar per 28 grams of product. In some embodiments the reduced sugar cereal can have about 29 wt % sugar, such as about 8 grams or less per 28 grams of product. In other embodiments the reduced sugar cereal can have about 28 wt % sugar or less, such as about 9 grams or less of sugar per 32 grams of product. In still other embodiments, the reduced sugar cereal can have about 25 wt % sugar, such as about 7 grams or less per 28 grams of product. In still other embodiments, the reduced sugar cereal can have about 21 wt % sugar, such as about 6 grams of sugar or less per 28 grams of product.

Embodiments of the invention include cereals in which the slurry has a low sucrose to soluble solids ratio (the ratio of sucrose in the slurry to the total dry soluble solids in the slurry). For example, the sucrose to soluble solids ratio of the slurry (the "dried slurry" or the "slurry layer") can be less than 0.87, such as about 0.40 to 0.85, or about 0.65-0.85, or about 0.68-0.80. In some embodiments, the particulate layer is sucrose and the sucrose to soluble solids ratio in the dried slurry can be about 0.40 to 0.85, e.g., about 0.75-0.85, such as about 0.75-0.80. In other embodiments, the particulate layer is pregel starch and the sucrose to soluble solids ratio of the slurry can be about 0.40 to 0.85, e.g., 0.65-0.85, such as about 0.68-0.80.

Embodiments of the invention can alternately or also include a coating having a low total sucrose to soluble solids ratio (the total weight of sucrose in the coating (including the slurry and particulates) to the total weight of dry soluble solids in the coating). For example, the total sucrose to soluble solids ratio in a coating (for any particulates, including sucrose) can be less than about 0.87, e.g., about 0.40 to 0.85, such about 0.76-0.85, or about 0.77-0.80.

The RTE cereal product can be in the form of a free flowing or aggregated mixture of individually coated pieces. The entire piece can be coated with the slurry and particulates. In some embodiments, such as shred biscuits or flat squares, either one surface, such as one of two major opposing planar surfaces, can be provided with the coating, or the entire surface can be coated. In still other variations, the surfaces can be internal (see for example, U.S. Ser. No. 10/042,835 "Laminated Multi-Layered Cereal Products And Methods Of Preparation," filed Jan. 8, 2002. to Krysiak).

The base 20 can be one or more food piece that are beneficially coated or combined with the present coating compositions. The food pieces could be of any food type which is desired to be provided with a sweetened or particulate coating and include, for example, puffed and unpuffed grains and the like. In particular, the base 20 can be one or more common shaped and sized pieces of RTE cereals whether flakes, puffs, shreds, biscuits, O's, and mixtures thereof fabricated from a cooked cereal dough. The cereal 10 can also be in the form of puffed pieces of wheat, rice, corn, etc. In some embodiments the pieces are dried food pieces having a moisture content of about 1-5%. In other variations the base 20 can be in the form of puffed or unpuffed pieces. An example of an unpuffed (but possibly leavened) base piece 20 is a cookie or biscuit. A partially puffed piece can be, for example, a square (i.e., a generally planar piece formed by toasting pieces cut from a cooked cereal dough sheet).

Any conventional puffed cereal or method of preparation can be used herein to provide a puffed cereal base. Exemplary compositions and methods of puffed cereal preparation are found in, for example, U.S. Pat. No. 3,464,827, (issued Sep. 2, 1969 to T. Tsuchiya, et al.); U.S. Pat. No. 3,600,193, (issued Aug. 17, 1971 to E. F. Glabel, et al.); U.S. Pat. No. 3,246,990, (issued Apr. 19, 1966 to Thompson, et al.); and U.S. Pat. No. 3,687,687, (issued Aug. 29, 1972 to A. L. Liepa), each of which is incorporated herein by reference.

Base pieces 20 such as squares (i.e., generally planar pieces), especially square or rectangle shapes and biscuits, can be fabricated from cooked cereal dough containing barley corn (maize), oats, rice, wheat, and mixtures thereof and blends of such pieces. Minor cereal grains such as amaranth, triticale and the like are also known and can be used. The pieces can be puffed or unpuffed. The present application also finds suitability for use in connection with complexly shaped as are described in U.S. Pat. No. 6,143, 342 as well as spherical or shaped puffed pieces fabricated from corn based cooked cereal doughs depicted in U.S. Pat. No. D339,443 and/or D339,444. Embodiments of the invention can include planar shaped pieces fabricated from wheat and rice based cooked cereal doughs. The surface can be smooth or include corrugations. In some embodiments the cereal includes cinnamon flavored and nonflavored topically presweetened RTE cereal products. Mixtures of various base pieces 20 are contemplated, such as a mixture of two or more cereal flavors and/or shapes or sizes. Also, the base 20 can include other pieces such as nuts or nut pieces or flaked grains such as oatmeal flakes. In still other variations the base 20 can include small pretzel shapes. In still other variations the base 20 can be in the form of an undried baked good or sweet good such as a doughnut (whether yeast raised or chemically leavened). In still other variations the base 20 can be provided by cooked cereal dough pieces typically shaped and sized for snacks especially corn based pieces such as the cornucopia shaped pieces described in U.S. Pat. No. design 202,609 "Puffed Snack Food Product (issued Oct. 26, 1965 to Weis et. al.; (or the shapes described in U.S. Pat. Nos. D 339,443; D 339,444; D 341,469; D 368,791; D 372,352; D 373,671; D 384,785; or D 403,485) or that puffed triangular pillow design described in U.K. design No 2012722 "Snack Food Product" registered 2 Aug. 1991 to General Mills, Inc.

In some embodiments, the base pieces 20 themselves are low in sucrose content, such as under 15% by weight total sucrose in the base 20, or such as less than 10% total sucrose in the base and in some embodiments, less than 2% sucrose. As a result, the finished coated comestibles can have sucrose contents of not more than about 30%, and in some embodiments less than about 25%. If desired the base pieces 20 themselves can be sweetened by inclusion of high potency sweeteners.

The size of the base pieces 20 can vary. In some embodiments the base pieces 20 range from about 35 to 65 pieces per 10 grams. In some embodiments the base pieces 20 are provided as dried pieces of cooked cereal dough in the form of planar pieces (such as disks or squares having opposed major faces) having surfaces of about 100-300 $mm^2$ and measuring about 0.5-2.0 mm in thickness.

The slurry layer 30 is coated onto a surface of base 20 to optionally surrounds the base 20 and is the first component of the coating. Embodiments of the invention can decrease the sucrose content of the cereal by using a low sucrose slurry having a decreased amount of sucrose in the slurry coating composition. Alternatively, a standard slurry composition can be used but less volume of the slurry can be applied to the base 20. In some embodiments a low sucrose slurry is used and a lower quantity is used as compared to standard cereals, so that the sucrose content is additionally reduced.

While standard slurries contain 80% or more sucrose, such as about 80-95% sucrose, reduced sucrose slurries can contain less than 80% sucrose. In some embodiments, the reduced sucrose slurry includes about 40 or 50-79 or 80% sucrose or about 50-70% sucrose. Extra low sugar slurries containing 30-50% sucrose may also be used in embodiments of the invention.

A portion of the slurry, such as a non-sucrose soluble solids portion, can be supplied by impure or flavored saccharidic ingredients such as fruit juices, purees, honey nectars, concentrated fruit, or sugar syrup including corn/glucose syrup, corn/glucose syrup solids, high fructose corn syrup, honey, refiners' syrup, molasses, maple syrups, grain syrups (e.g., barley syrups, oat syrup, tapioca syrups), malt syrups, malt syrup solids, rice syrup solids, rice syrups, and sorghum syrups. The slurry can include various types of non-sucrose sugars such as glucose, dextrose (e.g., anhydrous, monohydrate or dextrose syrup), fructose, levulose, mannose, invert sugar and galactose and disaccharide sugars such as sucrose, maltose, trehalose, and lactose, and/or carbohydrate oligomers and polymers such as dextrin, and/or soluble fibers, such as polydextrose, fructo-oligosaccharides, xylo-oligosaccharides, galacto-oliosaccharides, and soluble corn fiber. These ingredients may also include sucrose.

A component used to provide a non-sucrose portion of the slurry (preferably including non-sucrose soluble solids such as non-sucrose sugar) can impart certain advantages to the final product. Similar advantages can also be provided by other components of the slurry. For example, certain non-sucrose sugars and other components provide advantages in being low cost, while others are more attractive to customers when seen on a label, and still others are associated with positive health claims. Examples of such sugars, e.g., non-sucrose sugars, and other components which can be included in embodiments of the invention are shown in Table 1 below.

TABLE 1

| Low cost | Label friendly | Health | "Chemical" names |
| --- | --- | --- | --- |
| Corn syrup | Fruit juice, puree, concentrates | Polydextrose | Fructose (levulose) |
| Glucose syrup | Molasses | Inulin | Glucose (dextrose) |
| Refiner's syrup | Honey (nectar) | Chickory root extract (Jerusalem artichoke extract) | Glucose syrup |
| Corn/glucose syrup solids | Maple syrup | Fructo-oligosaccharides (FOS) | Invert sugar |
| Maltodextrin | Grain syrups (oat, rice, wheat, barley, tapioca, sorghum) | Xylo-oligosaccharides | Dextrin (dextrose oligomers) |
| High fructose corn syrup | Malt syrup (solids) | Galacto-oligosaccharides | Crystalline fructose |
| High maltose corn syrup | Chickory root extract (Jerusalem artichoke extract) | Soluble fiber (corn, citrus, inulin, guar, gum acacia, xanthan, carboxymethylcellulose) | Mannose |
| | | Partially soluble fiber (sugar beet, cocoa). | Trehalose |
| | | Isomalto-oligosaccharides | Lactose, tagatose |

In some embodiments, the low sucrose slurry includes high conversion maltodextrin or low conversion syrups having a dextrose equivalent ("DE") ranging from about 5 to less than 43, such as about 5 to about 42 to insure that the level of sugars (mono- and disaccharides) is low. In contrast, conventional 63DE corn syrups, high maltose corn syrup, and high fructose corn syrups (having DE ranging from about 52-97), and pure sugars such as sucrose, fructose, dextrose, glucose, lactose have a D. P or one or two. For example, 63DE corn syrup has a sugar content of 66% (db), 42DE corn syrup has a sugar content of 35% (db), 36DE corn syrup has a sugar content of 25% (db), and 26DE corn syrup has a sugar content of 15% (db). Alternatively, non fractionated corn syrups can be used in low sucrose slurries. (Non fractionated corn syrups can have up to 35% (db) by weight of constituents having a D.P of 1-2. While less pure, such materials are much less expensive than pure fractionated syrups.)

In some embodiments, the low sucrose slurry can include one or more supplemental or secondary sugars or nutritive carbohydrate sweetening ingredients. For example, the slurry can include soluble oligosaccharides. As used herein "oligosaccharides" describes a molecule containing three to twenty sugar units joined by glycosidic bonds. The soluble fiber inulin, is an example of an oligosaccharide useful herein as a supplemental soluble sugar which may be provided as part of the slurry. Alternatively or additionally, inulin in a powder form may be provided as a component of the particulate layer.

In some embodiments, the slurry can also include a high potency sweetener or blends thereof. Useful high potency sweeteners include but are not exclusive to, aspartame, saccharin, alitame, cyclamate, potassium acetysulfame (or more commonly referred to as "potassium acetysulfame K" or even "AceK"), sucralose, Stevia, and Monatin. Preferred for use herein are those high potency sweeteners that are stable upon extended storage and are also heat stable, such as sucralose and potassium acetysulfame and mixtures thereof. Additional high potency sweeteners may be developed or approved and those to-be-developed sweeteners, especially those thermally stable, are contemplated for use herein. Alternatively, the high potency sweetener can be blended with the particulate and dry coated onto cereal.

The slurry optionally can be either a reduced or low sucrose slurry, or a non-reduced sucrose slurry, and can include a sugar syrup (e.g., containing non-sucrose soluble solids and little or no insoluble solids or oil components), optionally an insoluble oil component, whether or not emulsified, and optionally other insoluble solids such as flavorants, colorants, or insoluble salts. In some embodiments a reduced sugar (reduced sucrose) slurry includes about 40-80 wt % sucrose, such as about 60-80% sucrose; about 0-60 wt % non-sucrose soluble solids such as corn syrup or the like, such as about 10-50% total non-sucrose soluble solid syrup; about 1-10 wt % oil, such as about 1-5 wt % oil; and about 4-35 wt % moisture, such as about 14-30 wt % moisture. For comparison, for use in previous coatings, some standard slurries have included about 80-100 wt % sucrose, such as about 80-95% sucrose; about 0-35 wt % corn syrup or total syrups; about 0-5 wt % oil; and about 14-30 wt % moisture. The corn syrup portions can alternatively be provided by or partially provided by, refiners syrup, molasses, and/or honey. In some embodiments, higher sucrose slurry or a standard slurry can include 63DE corn syrups while a lower sucrose or reduced sucrose slurry may include 36DE or lower DE corn syrups.

In addition to a slurry layer 30, a coating also includes a particulate layer 40 comprised of dry charged particulates, which may be of a single composition or include a combination of dry charged particulates of various compositions. The particulate layer 40 can contain, or can be prepared from a composition that contains mostly substantially, or entirely dry particulates, e.g., at least 90, or up to about 100 weight percent dry particulates. The particulates may be any single type (e.g., sugar, protein, starch, fiber, flavorant, etc.) of particulate as described herein, a single species (e.g., sucrose, cinnamon, cocoa, soy protein, gelatin, etc.) or mixture of particulate from among the various different types (e.g., sugar, protein, starch, fiber, etc.); the particulates may be a mixture of two or more types of particulates or two or more species of particulates from a single particulate type or different particulate types; i.e., a mixture of two different types of particulates such as a sugar and a protein, a mixture of two sugars such as sucrose and glucose, or a mixture of sucrose and flavorant.

Specific examples of particulate mixtures may include a combination of a majority (e.g., at least 50, 80, or 90 weight percent) of sugar (e.g., sucrose) particulates, optionally a minor amount (less than 10 percent, less than 5, 2, or 1 weight percent) of flavorant particles such as cinnamon, cocoa, vanilla particulates or a combination thereof, optionally also a minor amount (less than 10 percent, less than 5, 2, or 1 weight percent) of insoluble solid particulates such as calcium carbonate or titanium dioxide particulates. Another specific example of a mixture of particulates may include a combination of a majority (e.g., at least 50, 80, or 90 weight percent) of flour particulates and a minor amount (less than 30 weight percent, less than 25 or 15 weight percent) of sugar particulates such as sucrose particulates.

In certain embodiments the particulate layer or the composition (particulates) from which the particulate layer is prepared (i.e., the dry charge particulates) can consist of or consist essentially of any single species (e.g., sucrose, whole wheat flour, specific starch types or species, specific proteins) of particulate material described herein, or a single type of particulate from among the various different particulate types (e.g., sugar, protein, flavorant, starch, fiber, flour, etc.). A particulate layer or a composition from which the particulate layer is prepared is considered to consist essentially of particulates if the layer or composition contains less than 0.5, or 0.1 weight percent of solid materials different from the particulates.

Certain particulates can be used in particulate layer 40 to provide the advantages described herein. The particulates can be characterized as powders, crystalline powders, high molecular weight amorphous powders, low molecular weight crystalline powders, high molecular weight crystalline powders, and low molecular weight amorphous powders (silica, mica). The particulates can be dry, e.g., containing less than 2 weight percent, less than 1 weight percent, or less than 0.5 or 0.1 weight percent moisture.

High molecular weight amorphous polymers include pregelatinized starches, proteins, hydrophilic colloids, and partially soluble fiber. For example, cocoa powder, gums, proteins, partially hydrolyzed starch derivatives, pregel starches, and pregel whole grain or non-whole grain flours from grains such as corn, oat, rice, and wheat are high molecular weight amorphous polymers useful in embodiments of the invention. By high molecular weight is meant the starch has not been severely hydrolyzed in this context. By amorphous is meant non-crystalline. According to certain embodiments a particulate layer can include, or can be prepared from a composition that contains mostly dry high molecular weight amorphous polymer particulates, e.g., at least 70, at least 80, at least 90, or up to about 100 weight percent dry high molecular weight amorphous polymer particulates, e.g., may consist of or consist essentially of high molecular weight amorphous polymer particulates; the high molecular weight amorphous polymer may be any single species as listed (e.g., cocoa powder, protein, partially hydrolyzed starch derivative, pregel starch, etc.) or may be a mixture of two or more species.

In some embodiments the particulates include pregel starch, also referred to as PG starch or pregelatinized starch. Starches generally require heating to their gelatinization temperature in order for them to gel. Starches that have been gelatinized and then cooled and dried are referred to as pregel starches. Any pregel starch can be used in embodiments of the invention, alone or in combination with one or more other particulate type. The pregel starch can be either a modified or an unmodified starch. In some embodiments, a pregel starch can be an acid thinned pregel starch.

In some embodiments, the pregel starch can be a pregel flour obtained from any grain or seed type. For example, the pregel starch can be derived from common major cereal grains such as corn (maize), wheat, barley, rice, oats, and ground finished puffed cereal "regrinds." The regrinds can be from the same finished cereal pieces or cereal base as the cereal being produced. Alternatively, the regrinds can be from base or finished cereal created during production of a different cereal. In some embodiments, a combination of regrind sources can be used, including regrinds of the cereal being produced as well as other regrinds from other cereals. The regrind material can be combined with other sources of particulates, such as pregel starch, for use as particulate layer 40.

Alternately, a starch can be derived from various tuber sources such as tapioca, potato, cassava, or from a minor cereal grain such as amaranth, triticale, and the like, as well as heritage grains. The starch material can also be supplied in whole or in part by such minor or "heritage" grains such as spelt, kamut, quinoa, and mixtures thereof. In some embodiments, the pregel starch can be derived from native corn. While not produced in large quantities, such minor and/or heritage grains are especially popular among those interested in organic foods. Both organic and conventional sourced pregel starches are contemplated herein.

In other embodiments, the particulates can include partially hydrolyzed starch products such as high molecular weight dextrins and high molecular weight maltodextrins (1-10DE).

According to certain embodiments a particulate layer can include, or can be prepared from a composition that contains mostly dry pregel starch particulates, e.g., at least 60, at least 70, at least 80, at least 90, or up to about 100 weight percent dry pregel starch particulates, e.g., may consist of or consist essentially of dry pregel starch particulates. The pregel starch particulates may be any single species of pregel starch (e.g., a particular modified starch, a particular un-modified starch, corn starch, dextrins, maltodextrins) or may be a mixture of two or more pregel starch species.

In still other embodiments the particulates are high molecular weight soluble fibers, such as guar, citrus fiber, inulin, gum acacia, carboxymethyl cellulose, or xanthan. According to certain embodiments a particulate layer can include, or can be prepared from a composition that contains, mostly dry high molecular weight soluble fiber particulates, e.g., at least 60, at least 70, at least 80, at least 90, or up to about 100 weight percent high molecular weight soluble fiber particulates, e.g., may consist of or consist essentially of high molocular weight soluble fibers particulates. The particulates may be any single species of high molecular weight soluble fiber (e.g., guar, citrus fiber, inulin, etc.,) or may be a mixture of two or more high molecular weight soluble fiber species.

In still other embodiments the particulates are protein. Proteins useful as particulates including dairy and plant proteins including soy protein (soy meal, soy protein concentrate, soy flour), milk based proteins (casein, whey), gelatin, vegetable proteins (pea, canola, rice), nut, legume, and egg based proteins, wheat gluten, partially hydrolyzed wheat proteins, and gelatin.

A particulate layer can include, or can be prepared from a composition that contains, mostly dry protein particulates, e.g., at least 60, at least 70, at least 80, at least 90, or up to about 100 weight percent protein particulates, e.g., may consist of or consist essentially of protein particulates. The protein particulates may be any single species of protein or may be a mixture of two or more protein species.

In still other embodiments, the particulates are a partially soluble fiber. Such fiber can include sugar beet fiber and cocoa powder, for example. A particulate layer can include, or can be prepared from a composition that contains, mostly dry partially soluble fiber particulates, e.g., at least 60, at least 70, at least 80, at least 90, or up to about 100 weight percent partially soluble fiber particulates, e.g., may consist of or consist essentially of partially soluble fiber particulates. The partially soluble fiber particulates may be any single species of partially soluble fiber or may be a mixture of two or more species.

In still other embodiments, the particulates are insoluble fiber particulates. Such insoluble fiber can include corn bran, wheat bran, cellulose, and combinations of these. A particulate layer can include, or can be prepared from a composition that contains, mostly dry insoluble fiber particulates, e.g., at least 60, at least 70, at least 80, at least 90, or up to about 100 weight percent insoluble fiber particulates, e.g., may consist of or consist essentially of insoluble fiber particulates. The insoluble fiber particulates may be any single species of insoluble fiber or may be a mixture of two or more species.

Alternatively, the particulates can be a low solubility non-sugar compound, such as inositol, mannitol, or erythritol. A particulate layer can include, or can be prepared from a composition that contains, mostly low solubility non-sugar compound particulates, e.g., at least 60, at least 70, at least 80, at least 90, or up to about 100 weight percent low solubility non-sugar compound particulates, e.g., may consist of or consist essentially of low solubility non-sugar compound particulates. The particulates may be any single species of low solubility non-sugar compound or may be a mixture of two or more species.

In still other embodiments, the particulates can be sugar such as fructose, sucrose, glucose, etc. A particulate layer can include, or can be prepared from a composition that contains, mostly sugar particulates, e.g., at least 60, at least 70, at least 80, at least 90, or up to about 100 weight percent sugar particulates, e.g., may consist of or consist essentially of sugar particulates. The particulates may be any single species of sugar (e.g., sucrose) or may be a mixture of two or more sugar species.

Low molecular weight crystalline powders useful in embodiments of the invention include sucrose, inositol, salt, calcium carbonate, and sugar alcohols, for example. By low molecular weight is meant less than 500 g/mole in this context. Preferably the particulate is substantially free of added crystalline fructose, such as less than 2% of the finished cereal. Any pre-gelatinized starch containing flour or whole grain flour can be used. Inorganic amorphous powders useful in embodiments of the invention include silica and mica. The dry coated particulates can have a particle size sufficiently small to provide a non-gritty texture to the finished product. In some embodiments, the dry charged particles can have a mean particle size (volume average) of about 150 microns or less (≤150 μm), optionally 100 microns or less. In some of these embodiments, the particle size is between about 2 and 50 microns (μm) (volume average). In some embodiments, the particle size is about 5-25 μm (volume average). In other embodiments, such as crystalline sucrose, the particle size can be within any of these ranges or also in a range from about 30 to about 150 μm (volume average).

In some embodiments, the dry charged particulate layer 40 includes a combination of more than one type of particulate. For example, the particulate layer 40 may include dry charged sucrose and another type of dry charged particulate. Examples of mixtures can include a sugar (e.g., sucrose) in combination with one or more of a protein, a starch (dextrose, maltodextrose), a soluble fiber, and a flavorant (cocoa, cinnamon, vanilla); e.g., sucrose and cocoa. The different particulates of the more than one dry charged particulates may be applied to the shiny simultaneously, such as a mixture or separately but simultaneously, or the particulates may be applied consecutively. A particulate layer can include, or can be prepared from a composition that contains, mostly the mixture of particulates, e.g., at least 60, at least 70, at least 80, at least 90, or up to about 100 weight percent of the mixture of particulates, e.g., may consist of or consist essentially of the mixture of particulates.

In some embodiments, dry charged particulates are applied to the coated cereal to form the final, outermost layer of the cereal 10. This dry charged particulate layer 40 can adhere to the slurry-coated cereal and no further processing may be necessary. As such, the slurry is sufficiently sticky and is applied in a sufficient amount that there is no need to apply an overcoat to hold the dry charged particles in place or to adjust the flavor of the cereal. However, in other embodiments, another layer or treatment can be applied over the dry particulate layer 40 such as heat sensitive vitamins that can be applied to the cereal after the slurry layer 30 and either before or after the dry charged particulate layer 40.

A coating (including the slurry layer and particulates) can include sucrose in an amount in a range from about 40 or 50 to about 79 or 80% sucrose, e.g., about 50-70% sucrose. Extra low coatings containing 30-50% sucrose may also be used in embodiments of the invention.

In some embodiments, the coating compositions, either the slurry, the dry charge particulates, or both, can additionally include any of a variety of adjuvant materials to enhance the color, taste, appearance, or nutritional properties of the coatings. Such adjuvant ingredients can include, for example, minerals, vitamins, colorants, preservatives and flavors. If present, each of these constituents can comprise from about 0.01% to about 10% of the coating. These adjuvant materials can be added to the cereal in various ways, for example as part of the particulate layer 40 or separately dry charged before or after the particular layer 40 or as part of the slurry.

In some embodiments, flavors such as fruit flavors, chocolate or cocoa powder, or other flavors in powder form (e.g., spray dried on a starch particulate carrier), cinnamon, vanilla, and mixtures thereof, can be included in the particulates. In each of the cocoa flavored and cinnamon flavored variations, the particulates can also include supplemental flavors such as vanilla. In some embodiments, the flavors are present in powder form at levels ranging from about 1% to 10% of the particulates, or from 1% to 10% of the coating.

High potency sweeteners can be included in the slurry layer 30 or in the particulate layer 40. High potency sweeteners suitable for the present invention include both natural and synthesized materials. Certain preferred materials can include potassium acetylsulfame, sucralose, or mixtures thereof. Alitame, neotame, saccharin, and cyclamates can also be used. Thaumatin can also be used and provides the advantage of flavor masking. In another embodiment, trehalose and/or tagatose can be included for sweetness enhancement. In yet another embodiment, the slurry layer 30 or particulate layer 40 can include supplemental high potency "natural" or plant sweeteners such as stevia, stevioside from ground stevia leaf, stevia extracts (from *Stevia rebaudian*, an herb native to Peru and Paraguay), lo han fruit extracts, and rubusoside. Lo Han fruit extract (a.k.a. lo han kuo, lo han quo, arhat fruit, monks fruit) is derived from the fruit of the plant *Siraitia grosvenorii*. Another high potency natural sweetener, rubusoside, can be extracted from the leaves of *Rubus suavissimus* (Chinese blackberry). Stevia extracts can be further refined to include isolations, refinements, or separations of active compounds within the stevia extract, one example of which is rebaudioside A (a.k.a. rebiana).

High potency sweeteners can be used at amounts effective to provide desired sweetness levels. Other sweetness enhancers and derivatives that can be used include, for example, glycyrrhizin, neohesperidine dihydrochalcone, mogoside, monellin, mabinlin, pentadin, brazzein, and curculin. Such materials are often blended with or formed into powder form by mixing with a solid substrate or carrier such as a starch or maltodextrin. While not temperature stable per se, the sweeteners can be added at levels that compensate for losses during processing. In some embodiments, such materials can be added to the cooled slurry so as to minimize any loss due to exposure to elevated temperatures. Such products can be used at levels ranging from about 0.001% to about 1%, for example, depending upon the sweetening power of the active ingredient and concentration of the active ingredient in the sweetener ingredient.

Figure 2:
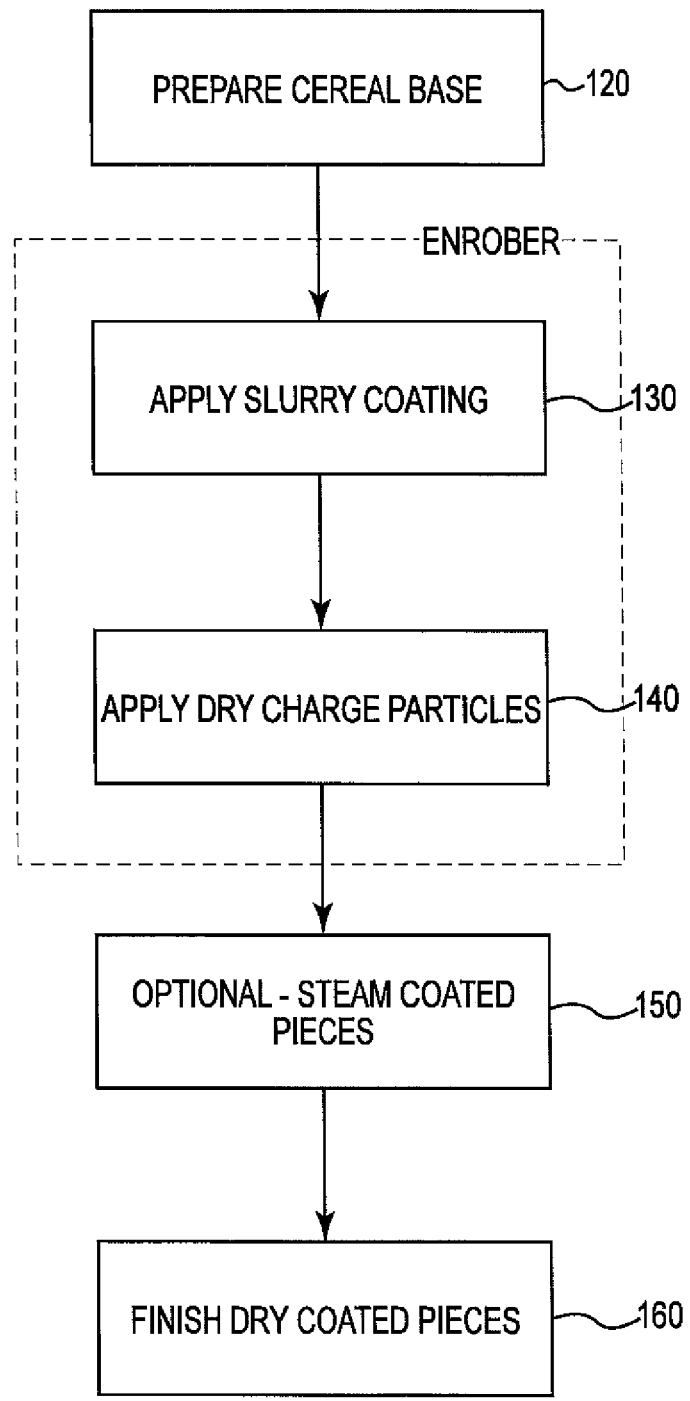
FIG. 2 is a flow chart demonstrating a method of coating a cereal according to embodiments of the invention.

Embodiments of the cereal 10 can be prepared as shown in FIG. 2. In step 120, the cereal base 20 is prepared according to known methods. In certain variations, the base 20 can comprise and be prepared from cooked cereal dough. The cooked cereal base 20 can comprise expanded pieces such as pieces that are prepared by direct expansion from an extruder. The base 20 can then be optionally dried.

For those food products requiring low moisture contents, i.e., wherein the base 20 is supplied in the form of dried food pieces, all or a portion of the drying operation of the base can performed prior to the application of the slurry layer 30. Any conventional drying technique can be used to reduce the moisture content of the cereal base pieces 20. The drying can be accomplished using equipment such as a rotary bed, tray, or belt dryers. Simple hot air convection drying, e.g., 200-280° F. (93.3 to 137.8° C.), can be used. In certain applications, e.g., the provision of puffed cooked cereal dough pieces by direct expansion from a cooker extruder, the moisture content can be of suitable range without the need for a separate drying step.

For embodiments including a puffed cereal base, any conventional method of preparation can be used. Exemplary compositions and methods of puffed cereal preparation are found in, for example, U.S. Pat. No. 3,464,827, (issued Sep. 2, 1969 to T. Tsuchiya, et al.); U.S. Pat. No. 3,600,193, (issued Aug. 17, 1971 to E. F. Glabel, et al.); U.S. Pat. No. 3,246,990, (issued Apr. 19, 1966 to Thompson, et al.); and U.S. Pat. No. 3,687,687, (issued Aug. 29, 1972 to A. L. Liepa), each of which is incorporated herein by reference. Prior to application of the slurry layer 30, the base pieces 20 themselves can have density ranging from about 0.15 to 0.5 Wee, such as about 0.2 to 0.3 Wee. Due to the various shapes and their packing factors, the bulk densities of quantities of the base 20 prior to coating can range from about 0.05 to 0.25 g/cc.

To prepare the slurry, such as the low sugar and standard slurries, the ingredients can first be combined in a first or make up kettle to prepare the slurry in batch fashion. Next, the slurry can be fed to a use kettle that can supply a continuous stream of the slurry to a concentrator. The concentrator can be heated, such as by steam, which in turn heats and concentrates the slurry by driving off water vapor to provide a concentrated slurry of desired temperature, pressure and concentration. In other variations, the provision of concentrated slurry can be practiced in a single vessel or in various equipment as desired.

A variety of optional ingredients or adjuvant can be added to the slurry. Such optional ingredients can include flavors, colors, minerals, vitamins, preservatives, and supplemental high potency, oil, and mixtures thereof, examples of which are provided in U.S. Provisional Patent Application No. 61/360,555, filed Jul. 1, 2010. If present, such ingredients can comprise about 0.1 to 15% of the coating composition. The vitamins selected should preferably be heat tolerant.

The reduced sugar or standard slurry is applied to the base at step 130. The slurry can be applied to the base 20, for example, using an enrober drum or other coating vessel or equipment, such that the slurry is at an elevated temperature and thus fluid. In some embodiments, the slurry is coated onto the base 20 in the form of a fine spray in the enrober. The temperature of the slurry can be between about 200 to 300° F. (93.3 to 148.8° C.), such as 212 to 300° F. (100 to 148.8° C.), or between 220 and 270° F. (104.5 to 132.2° C.). In some embodiments, the weight ratio of cereal base to slurry coating can be between about 100:5 and 100:150, and in some embodiments it is between about 100:30 and 100:120.

Any conventional enrobing apparatus and technique can be used to practice the present enrobing or application step, which additionally involves cereal piece tumbling. The base pieces 20 and slurry can each be charged in any order to a rotating drum or barrel-type enrober and tumbled for a sufficient time to achieve an even distribution of the slurry on the base 20. For example, the slurry can be added after the base 20 has been added to the drum. Alternatively, the slurry can be sprayed onto the base pieces 20, which may or may not be tumbled, depending upon the shape and fragility of the pieces. In another alternative, the slurry coating can be applied using a belt or similar method. In such alternatives, and in other methods, the coating can optimally be applied to only one side of the cereal.

In some embodiments, multiple layers of slurry coating can be applied to the base pieces. For example, a two enrober system can be used for cluster production, in which a first slurry layer is more sticky and a second slurry layer is less sticky or non-sticky or vice versa.

In some embodiments, supplemental ingredients can be added to the base 20 in the enrober such as in the form of a separate stream than the slurry. For example, heat sensitive materials such as certain vitamins can be added in a substream. If desired, the vitamin sub-stream can additionally contain heat sensitive flavors, e.g. fruit flavors. The substream can also serve as a convenient technique for adding flavor acids such as malic, citric, or acid blends.

Next, the particulates are added to the cereal 10 by dry charging in step 140. The dry charged particulates can be any particulates or combination of two or more different particulates as described above. The particulates can be applied to the slurry coated base pieces in the same enrober as was used to apply the slurry. An example of an enrober which may be used in such embodiments is described in U.S. Provisional Patent Application No. 61/360,555, filed Jul. 1, 2010. Alternatively, the particulates can be separately applied to the slurry coated base pieces using a separate enrober, curtain coater, or other system for dry charging. The pieces can be tumbled during and/or after dry charging with the particulates.

The final step in preparation of the RTE cereal product is drying the cereal in a dryer at optional step 160. The drying step 160 functions to remove the moisture added with the slurry layer 30. After drying, the finished cereal base coated with the slurry and particulate coating can have a moisture content ranging from about 1% to 5% to provide shelf stable storage; e.g., the base can have a moisture content in a range from about 1% to 5%, and the applied coating (i.e., the dried slurry layer and the applied particulates) can independently have a moisture content in a range from about 1% to 5%. The amount of drying required can depend upon the moisture content of the slurry. For example, in some embodiments, greater drying can be needed for those embodiments wherein moisture is a greater proportion of the liquid binder portion of the coating. In other embodiments, the slurry coating can be at sufficiently low moisture content (i.e., under about 2 to 2.5% moisture) that post coating application drying is minimal or even unnecessary. In addition, a longer drying time can be required when a steam application step 150 has been used.

In some embodiments, the dried cereal pieces can be thereafter fortified with an exterior or topical application of heat sensitive vitamins. A vitamin(s) dispersion can be topically added to the cereal 10 such as by tumbling to form a vitamin fortified finished presweetened RTE cereal. For example, vitamin C, beta carotene and other heat labile vitamins can optionally be sprayed onto the cereal pieces after the drying step 160 in a separate enrober.

When the sugar content of coated cereals is decreased, a potential effect is the loss of efficiency. The reduction in sugar content of the coating can result in less coating mass being applied to each cereal base 20 as compared to a standard coated cereal. For example, if a standard slurry were used but in less quantity, the weight of the slurry coating applied to each cereal base 20 would be reduced, and the weight of the final coated cereal product would be less than the standard cereal. A similar reduction in mass contribution by the slurry occurs when the slurry has a reduced sucrose content. As a result, the final weight of cereal product produced per quantity of cereal base 20 used would be less than for a standard cereal. However, embodiments of the invention reduce or eliminate this inefficiency.

Figure 3:
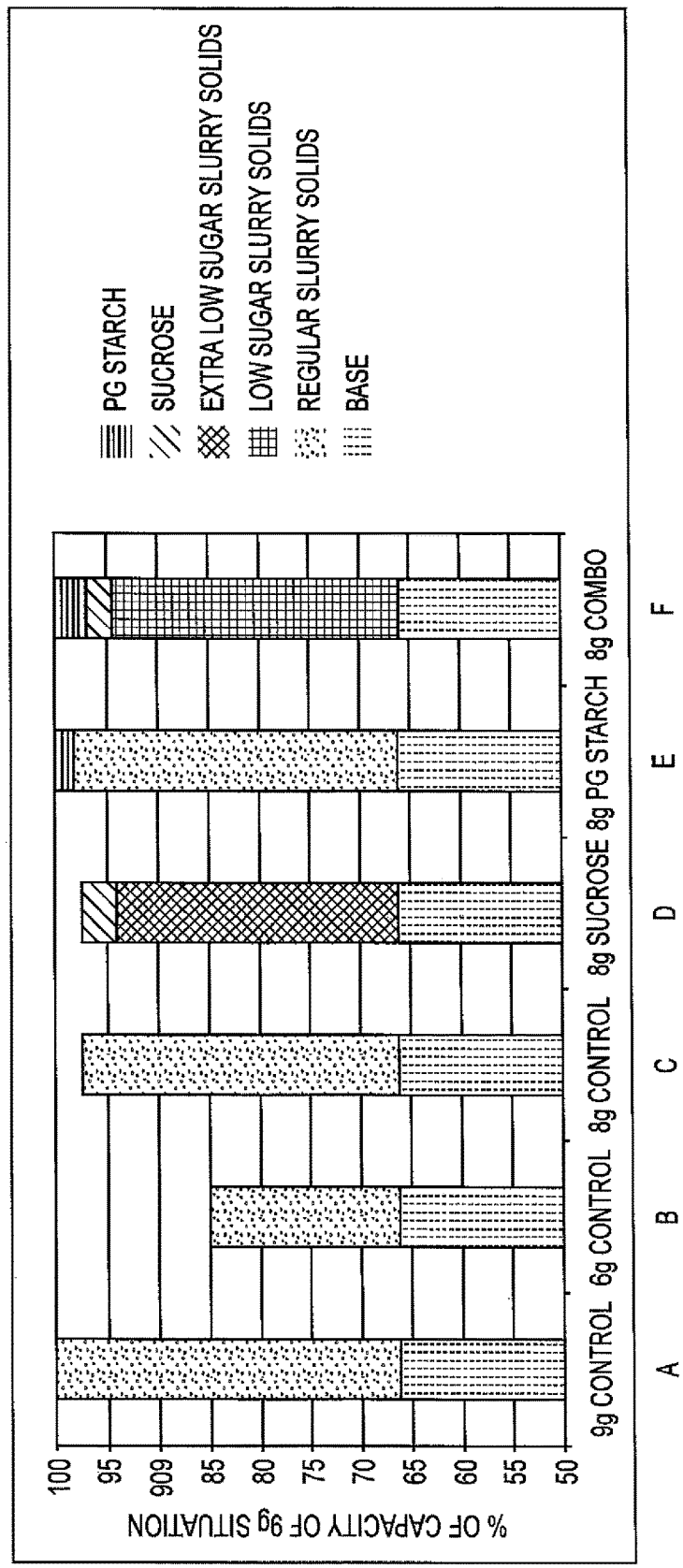
FIG. 3 is graph showing production efficiency for various cereals.
Figure 4:
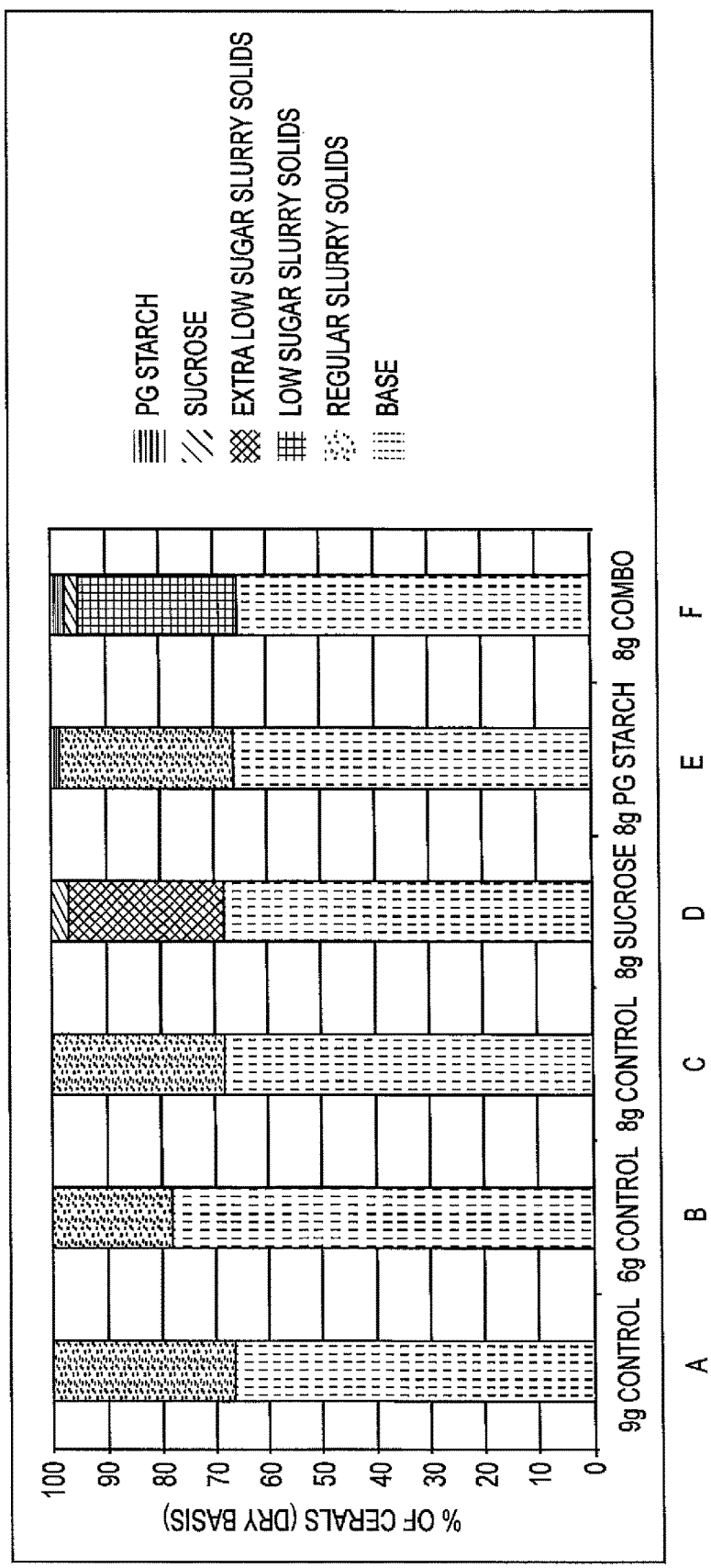
FIG. 4 is a graph showing the percent of the weight of the various cereals of FIG. 3 provided by each cereal component.

Embodiments of the invention replace the cereal bulk lost by the reduction in sucrose, which returns the production to full efficiency. Therefore, in addition to reducing cereal clumping, embodiments of the invention increase the production efficiency by providing a bulk substitute for the reduced sucrose. The dry charged coating therefore functions to replace the cereal bulk lost due to the decrease in sucrose and can return the process to full efficiency. This is demonstrated graphically in FIGS. 3 and 4. In these figures, bar A depicts a standard, full sucrose cereal (referred to as the standard cereal or cereal A) having 100% efficient production. Bars B-F depict various reduced sucrose options, referred to as cereals B-F respectively. In FIG. 3, the percent of production capacity of each cereal is shown, as compared to a standard cereal having 9 grams of sugar per 28 grams of cereal. In FIG. 4, the percent of each component of the cereal, on a dry weight basis, is shown for each cereal. In each option, the same base 20 is used, as can be seen in FIG. 3.

In cereal B, a regular slurry is used but in a decreased amount, resulting in only 6 grams of sugar per 28 grams of cereal, as compared to 9 grams in the standard cereal. As a result of the decreased slurry volume, cereal B operates at only 85% of production capacity as compared to the standard cereal. In cereal C, a regular slurry is used at a slightly reduced amount as compared to the standard cereal. The result is a cereal having 8 grams of sugar per 28 grams of cereal and 98% production capacity. In cereal E, the cereal includes 8 grams of sugar per 28 grams of cereal, like in option C, but has 100% production capacity. As such, it can be seen that the use of a pregel starch allows a reduction in sucrose content while maintaining full production efficiency.

In cereal D, an extra low sucrose slurry is used, in a reduced amount as compared to the standard cereal, along with a layer of sucrose as a particulate layer 30. With sucrose as the outermost layer, this option can provide an enhanced perception of sweetness, while still having only 8 grams of sugar per 28 grams of cereal. However, when used in the amounts shown, the sucrose is not sufficient to provide the full coating weight of a standard cereal, such that the production capacity is 98%. In contrast, in cereal F, a low sucrose slurry and sucrose are used in the same amounts as in option F, but a PG starch is also used. The combination of PG starch and sucrose as particulates results in 8 grams of sugar per 28 grams of cereal, but production efficiency is 100%.

EXAMPLE 1

For all of the runs, the base pieces were uncoated O shape base pieces. A slurry coating was applied to the base pieces for each run. The slurry consisted of water, sucrose and syrups (corn syrup, honey, and syrup from sugar refining), salt, flavors, vitamins, and oil in the approximate amounts shown in Table 2 below.

TABLE 2

| | Run | | | | |
|---|---|---|---|---|---|
| Description | 1 Control, no particulate | 2 Control, no particulate | 3 sucrose particulate | 4 PGWGOF particulate | 5 PGWGCF & sucrose particulate |
| water | 15 | 15 | 14 | 15 | 14 |
| sucrose | 69 | 63 | 59 | 63 | 57 |
| syrup | 14 | 18 | 23 | 18 | 25 |
| Salt/vitamins/flavors | 1 | 1 | 1 | 1 | 1 |
| oil | 1 | 3 | 3 | 3 | 3 |
| sum | 100.0 | 100.0 | 100.0 | 100.0 | 100.0 |
| sugar per 28 g cereal | 9 g | 6 g | 6 g | 6 g | 6 g |
| s/ss | 0.865 | 0.805 | 0.755 | 0.805 | 0.736 |
| Amount of slurry added to 1 kg base | 586 g | 380 g | 367 g | 415 g | 366 g |

Different dry charged particulates were used for each of runs 3-5, as shown in Table 2 below, in which PGWGCF stands for pregel whole grain corn flour and PGWGOF stands for pregel whole grain oat flour. Run 1 was a standard cereal formulation including a standard slurry and no particulate layer and was used as a control with 9 g sugar per 28 g cereal. In all other runs, a reduced sugar slurry was used and the final cereals had 6 g sugar per 28 g cereal.

For each run, the cereal pieces were prepared as follows. 1 Kg of base pieces were placed in an enrober. The slurry was heated on a conventional stovetop to 220° F. (104° C.) and then was slowly poured over the base (approximately 15 seconds) in the amounts shown in Table 1, with the enrober rotating at approximately 50 rpm. The slurry coated base pieces were then rotated for 30 seconds. The dry particulates were then slowly poured through a 30 mesh screen into the enrober and sifted onto the slurry coated base pieces for about 25 seconds. The cereal pieces were rotated for 30 seconds, and then poured and spread evenly on a drying tray. The drying tray was transferred to a gas heated dryer and dried at 230° F. (110° C.) until the moisture level was about 2.2%. The coated cereal was then cooled on the tray for about 10-15 minutes and packaged into plastic bags. The process was repeated for each of the particulates shown in the 5 runs in Table 3.

TABLE 3

| Run | particulates | % particulate of coating (db) | Slurry s/ss | Total ts/ss | Clumped? |
|---|---|---|---|---|---|
| 1 | 9 g control | N/A | 0.87 | 0.87 | No |
| 2 | 6 g control | N/A | 0.80 | 0.80 | Yes |
| 3 | 6 g sucrose | 7 | 0.75 | 0.77 | No |
| 4 | 6 g PGWGOF | 20 | 0.80 | 0.80 | No |
| 5 | 6 g PGWGCF/Sucrose | 23.9 | 0.73 | 0.77 | No |

The sucrose to soluble solids ratio (s/ss) in Table 2 was calculated by dividing the weight of sucrose in the slurry by the total weight of dry solids in the slurry (including sucrose, honey, refiners syrup, molasses, corn syrups, and salt). The total sucrose to soluble solids ratio (ts/ss) was calculated by dividing the total weight of sucrose in the coating (including the slurry and the particulate layer) by the total weight of dry solids in the coating (including sucrose, honey, refiners syrup, molasses, corn syrups, and salt in the slurry and the particulate layer). The % particulate of the coating was calculated by dividing the total weight of the particulate layer by the total weight of dry solids in the coating (including the slurry and the particulate layer).

To measure clumping, the samples were removed from the plastic bags and placed air flow and moisture resistant containers for 1 week under constant conditions of elevated temperature and humidity. The incubated samples were then poured out of the containers and the degree of clumping was ranked as not clumped, clumped, or partially clumped.

In run 1, the control run, no clumping was present due to its high sucrose to soluble-solids ratio. In run 2, the sucrose to soluble solids ratio is low, 0.80, and no dry charge particulate was added and the product clumped, and the product was entirely clumped. In runs 3, 4, and 5, the product was reduced sugar cereal produced using a reduced sugar slurry and a particulate coating. In run 3, the particulate layer was sucrose. It was found that sucrose crystals with size smaller than 150 microns worked the best by giving a less bumpy appearance. In run 4, the particulate coating was a pregel whole grain oat flour. In run 5, after application of the slurry, a pregel whole grain corn flour was applied as a first particulate layer, and then an equal amount of Bakers Special sugar (measuring <150 microns) was applied as a second particulate layer. It is notable that the sucrose to soluble solids ratio (0.73) and the and the total sucrose to soluble solids ratio (0.77) were much lower than the run 2 in which the ratio was 0.80 but in which no particulates were used. At such low ratios, clumping would ordinarily be expected but no clumping was present due to the use of the particulate layer.

The invention claimed is:

1. A ready to eat cereal comprising:
   a base;
   a slurry layer on the base produced by applying a slurry coating to the base, the slurry layer containing from about 30 to about 80 parts by weight sucrose, from about 10 to 60 parts by weight non-sucrose soluble solids, and not more than 10 parts by weight oil based on total parts by weight sucrose, non-sucrose soluble solids, and oil;
   a particulate coating on the slurry layer, the particulate coating produced by applying particulates to the slurry coating, wherein the particulates comprise pregelatinized starch, whole grain flour, non-whole grain flour, dextrin, soluble fiber, partially soluble fiber, insoluble fiber, protein, or a combination thereof, wherein the coating of the slurry layer and the particulate coating has a ratio of weight sucrose to total weight soluble solids in a range from 0.3 to 0.85.

2. The ready to eat cereal of claim 1 wherein the cereal has about 32 weight percent or less sugar.

3. The ready to eat cereal of claim 2 wherein the slurry layer contains about 40-79 parts by weight sucrose.

4. The ready to eat cereal of claim 2 wherein the slurry coating is provided in a sufficient amount and to adhere the particulate coating to the cereal base and slurry without a coating layer around the particulate layer.

5. The ready to eat cereal of claim 1 wherein the particulates are pregelatinized starch.

6. The ready to eat cereal of claim 5 wherein the pregelatinized starch comprises cereal regrinds.

7. The ready to eat cereal of claim 5 wherein at least a portion of the pregelatinized starch is present as pregelatinized whole grain flour.

8. The ready to eat cereal of claim 1 wherein the slurry comprises high conversion maltodextrin and/or low conversion glucose syrup having a dextrose equivalent of about 1 to less than about 10.

9. The ready to eat cereal of claim 1 wherein the particulates have a mean particle size (volume average) of about 150 microns or less (≤150 μm).

10. The ready to eat cereal claim 1 wherein the combined slurry layer and particulate layer coating comprises less than 5% moisture and less than 80% sucrose.

11. The ready to eat cereal of claim 1 wherein the particulates comprise from 0.1 to 10 weight percent flavorant.

12. The ready to eat cereal of claim 1 wherein the particulates comprise from 0.1 to 10 weight percent insoluble solid selected from calcium carbonate, titanium dioxide, and a combination thereof.

13. The ready to eat cereal of claim 1 wherein the particulates comprise at least 50 weight percent flour particulates.

14. The ready to eat cereal of claim 1 wherein the particulates have a mean particle size (volume average) in a range from 2 to 50 microns (from 2 μm to 50 μm).

15. A method of preparing a ready to eat cereal comprising:
   providing a cereal base;
   coating the base with a slurry, the slurry containing from about 30 to about 80 parts by weight sucrose, from about 10 to 60 parts by weight non-sucrose soluble solids, and not more than 10 parts by weight oil, based on total parts by weight sucrose, non-sucrose soluble solids, and oil; and coating the slurry-coated base with particulates, wherein the particulates comprise pregelatinized starch, whole grain flour, non-whole grain flour, dextrin, soluble fiber, partially soluble fiber, insoluble fiber, protein, or a combination thereof, wherein the coating of the slurry layer and the particulate coating has a measured sucrose crystallinity value that is greater than or equal to a calculated crystallinity (y) value calculated according to the formula:

$$\text{crystallinity } (y) \geq 2.28x^2 - 1.19x + 0.28$$

wherein x is a ratio of weight sucrose per total weight soluble solids in the coating.

16. The method of claim 15 wherein the particulates form a particulate layer as an outermost layer of the cereal.

17. The method of claim 15 wherein the particulates adhere to the cereal without the use of an overcoating layer.

18. The method of claim 15 wherein the slurry is applied at a moisture content of at least 5%, the method comprising drying the slurry such that the combined slurry layer and particulates coating comprises less than 5% moisture and less than 80% sucrose.

19. A ready to eat cereal comprising:
a base:
a slurry layer on the base produced by applying a slurry coating to the base, the slurry layer containing from about 30 to about 80 parts by weight sucrose, from about 10 to 60 parts by weight non-sucrose soluble solids, and not more than 10 parts by weight oil based on total parts by weight sucrose, non-sucrose soluble solids, and oil;
a particulate coating on the slurry layer, the particulate coating produced by applying particulates to the slurry coating, wherein the particulates comprise pregelatinized starch, whole grain flour, non-whole grain flour, dextrin, soluble fiber, partially soluble fiber, insoluble fiber, protein, or a combination thereof, wherein the coating of the slurry layer and the particulate coating has a measured sucrose crystallinity value that is greater than or equal to a calculated crystallinity (y) value calculated according to the formula:

$$\text{crystallinity } (y) \geq 2.28x^2 - 1.19x + 0.28$$

wherein x is a ratio of weight sucrose per total weight soluble solids in the coating.

20. A ready to eat cereal comprising:
a base;
a slurry layer on the base produced by applying a slurry coating to the base, the slurry layer containing from about 30 to about 80 parts by weight sucrose, from about 10 to 60 parts by weight non-sucrose soluble solids, and not more than 10 parts by weight oil based on total parts by weight sucrose, non-sucrose soluble solids, and oil;
a particulate coating on the slurry layer, the particulate coating produced by applying particulates to the slurry coating, wherein the particulates comprise pregelatinized starch, whole grain flour, non-whole grain flour, dextrin, soluble fiber, partially soluble fiber, insoluble fiber, protein, or a combination thereof, wherein the non-sucrose soluble solids are selected from the group consisting of: fruit juices, purees, honey nectars, concentrated fruit, glucose syrup solids, corn syrup solids, high fructose corn syrup, honey, refiners' syrup, molasses, maple syrups, barley syrups, oat syrup, tapioca syrups, malt syrups, malt syrup solids, rice syrup solids, rice syrups, sorghum syrups, glucose, dextrose, fructose, levulose, mannose, invert sugar, galactose, maltose, trehalose, and lactose.

21. The ready to eat cereal of claim 20 wherein the non-sucrose soluble solids are selected from the group consisting of: fruit juices, purees, honey nectars, concentrated fruit, glucose syrup solids, corn syrup solids, high fructose corn syrup, honey, refiners' syrup, molasses, maple syrups, barley syrups, oat syrup, tapioca syrups, malt syrups, malt syrup solids, rice syrup solids, rice syrups, and sorghum syrups.

22. The ready to eat cereal of claim 20 wherein the non-sucrose soluble solids are selected from the group consisting of: glucose, dextrose, fructose, levulose, mannose, invert sugar, galactose, maltose, trehalose, and lactose.

23. A method of preparing a ready to eat cereal comprising:
providing a cereal base;
coating the base with a slurry, the slurry containing from about 30 to about 80 parts by weight sucrose, from about 10 to 60 parts by weight non-sucrose soluble solids, and not more than 10 parts by weight oil, based on total parts by weight sucrose, non-sucrose soluble solids, and oil, wherein the non-sucrose soluble solids are selected from the group consisting of: fruit juices, purees, honey nectars, concentrated fruit, glucose syrup solids, corn syrup solids, high fructose corn syrup, honey, refiners' syrup, molasses, maple syrups, barley syrups, oat syrup, tapioca syrups, malt syrups, malt syrup solids, rice syrup solids, rice syrups, sorghum syrups, glucose, dextrose, fructose, levulose, mannose, invert sugar, galactose, maltose, trehalose, and lactose; and
coating the slurry-coated base with particulates, wherein the particulates comprise pregelatinized starch, whole grain flour, non-whole grain flour, dextrin, soluble fiber, partially soluble fiber, insoluble fiber, protein, or a combination thereof.

24. The method of claim 23 wherein the non-sucrose soluble solids are selected from the group consisting of: fruit juices, purees, honey nectars, concentrated fruit, glucose syrup solids, corn syrup solids, high fructose corn syrup, honey, refiners' syrup, molasses, maple syrups, barley syrups, oat syrup, tapioca syrups, malt syrups, malt syrup solids, rice syrup solids, rice syrups, and sorghum syrups.

25. The method of claim 23 wherein the non-sucrose soluble solids are selected from the group consisting of: glucose, dextrose, fructose, levulose, mannose, invert sugar, galactose, maltose, trehalose, and lactose.

26. A method of preparing a ready to eat cereal comprising:
providing a cereal base;
coating the base with a slurry, the slurry containing from about 30 to about 80 parts by weight sucrose, from about 10 to 60 parts by weight non-sucrose soluble solids, and not more than 10 parts by weight oil, based on total parts by weight sucrose, non-sucrose soluble solids, and oil; and
coating the slurry-coated base with particulates, wherein the particulates comprise pregelatinized starch, whole grain flour, non-whole grain flour, dextrin, soluble fiber, partially soluble fiber, insoluble fiber, protein, or a combination thereof, wherein the coating of the slurry layer and the particulate coating has a ratio of weight sucrose to total weight soluble solids in a range from 0.3 to 0.85.

* * * * *